United States Patent
Ito et al.

(10) Patent No.: US 7,812,600 B2
(45) Date of Patent: Oct. 12, 2010

(54) POSITION DETECTING DEVICE FOR A VEHICLE AND SEAT POSITION DETECTING DEVICE

(75) Inventors: Sadao Ito, Anjo (JP); Akira Kamiya, Nagoya (JP); Yukihiro Kato, Chiryu (JP); Katsuyoshi Shirai, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 12/666,267

(22) PCT Filed: Nov. 4, 2008

(86) PCT No.: PCT/JP2008/070021
§ 371 (c)(1),
(2), (4) Date: Dec. 22, 2009

(87) PCT Pub. No.: WO2009/066560
PCT Pub. Date: May 28, 2009

(65) Prior Publication Data
US 2010/0219813 A1  Sep. 2, 2010

(30) Foreign Application Priority Data
Nov. 22, 2007 (JP) .............................. 2007-302962
Jun. 12, 2008 (JP) .............................. 2008-154326

(51) Int. Cl.
*G01B 7/30* (2006.01)
*G01D 5/34* (2006.01)

(52) U.S. Cl. .............................. 324/207.25; 250/231.13

(58) Field of Classification Search ............ 324/207.22, 324/207.23, 207.24, 207.25, 162, 173, 174, 324/178, 179; 250/231.13, 231.15, 231.18; 33/1 PT
See application file for complete search history.

(56) References Cited

U.S. PATENT DOCUMENTS

| | | | | |
|---|---|---|---|---|
| 5,470,283 A * | 11/1995 | Seidou | ........................ | 475/162 |
| 6,492,787 B1 | 12/2002 | Hibino et al. | | |
| 7,145,130 B2 * | 12/2006 | Sano | ...................... | 250/231.15 |
| 2006/0226674 A1 * | 10/2006 | Ito et al. | ................... | 296/65.13 |

FOREIGN PATENT DOCUMENTS

| | | | |
|---|---|---|---|
| JP | 3-112385 A | 5/1991 |
| JP | 7-164930 A | 6/1995 |
| JP | 2001-0992465 A | 4/2001 |
| JP | 2004-012305 A | 1/2004 |
| JP | 2004-352081 A | 12/2004 |

OTHER PUBLICATIONS

International Search Report issued by the Japanese Patent Office, in its capacity as International Searching Authority, in International Application No. PCT/JP2008/070021 on Feb. 24, 2009.

* cited by examiner

*Primary Examiner*—Kenneth J Whittington
(74) *Attorney, Agent, or Firm*—Buchanan Ingersoll & Rooney PC

(57) ABSTRACT

A position detecting device for a vehicle and a seat position detecting device which are compact in structure and low in production cost are proposed, in which the absolute position from the reference point can be always detected. The position detecting device for a vehicle for detecting a position of a mobile object for the vehicle which is moved by a driving force of a rotating driving source includes a deceleration device having a two-stage hypo-cycloid mechanism decelerating the rotation amount of a rotation shaft rotated plural revolutions to one revolution or less by the driving source upon the mobile object being moved and a rotation sensor detecting a rotation output from the deceleration device as an absolute angle, wherein a position of the mobile object is detected based on the absolute angle detected by the rotation sensor.

8 Claims, 12 Drawing Sheets

POSITION DETECTING DEVICE FOR A VEHICLE AND SEAT POSITION DETECTING DEVICE

TECHNICAL FIELD

This invention relates to a position detecting device for a vehicle for detecting a position of a mobile object which is moved by a driving force of a rotatable driving source and a seat position detecting device for detecting a seat front/rear position in a seat slide device for the vehicle by using the position detecting device.

BACKGROUND OF THE TECHNOLOGY

Recently, in a so-called power seat for driving the vehicle seat by motor, a position of a movable member of the vehicle seat is detected for controlling the driving of the motor. As one of such type device, the patent document 1 discloses a device in which the output voltage is watched at an output terminal of a reed switch provided between a plurality of resisters forming a series current circuit and a series of switches is fixed to an upper rail, a series of magnetic materials having a magnetic pitch which is same with the arrangement pitch of the reed switches is fixed to a lower rail, wherein the reed switch is turned ON in response to the approach of the magnetic materials and the switch position is judged by an output voltage from a branch circuit and a seat position can be detected by such detected position of the reed switch. By this structure, the detection of movable member of the power slide device from the reference point to the absolute position can be achieved without complicating the structure.

Further, according to the patent document 2, the document discloses a device in which a screwed bar is rotated by a driving force of a motor through worm and worm wheel mechanism to slide the upper rail and the movement amount is detected by a sensor provided at the tip end of the screwed bar. The sensor identifies the reed switch by magnets at both poles which rotate in synchronization with the rotation of the screwed bar thereby to turn ON/OFF of the indentified switch turn. The switch turns ON one time per one rotation of the screwed bar. The number of turning ON of the switch is accumulated by an ECU separately provided.

Further, according to the patent document 3, as a detecting means for detecting a position of a manually operated seat, the relative position from a memorized point is judged from the pulse count. Two Hall elements, one displaced from the other in a sliding direction and a magnet are used and a plurality of lock holes, each being provided on a slide lower rail, apart from one another having an equal distance. Two phase pulse edges generated from the Hall elements under the opposed position with the plurality of lock holes are used for judgment of position including the position in sliding direction. Counting base point can be clearly identified without any complicated setting by just setting the detection target hole desired to be the position of the base point in the sliding area to be in non-alignment condition with the two Hall elements.

Patent Document 1: Japanese Patent Application Publication No. 1995-164930A

Patent Document 2: Japanese Patent Application Publication No. 2004-352081A

Patent Document 3: Japanese Patent Application Publication No. 2004-12305A

DISCLOSURE OF INVENTION

Problems to be Solved by the Invention

However, according to the detecting device disclosed in the patent document 1, a plurality of reed switches to be fixed to the movable upper rail is necessary and the resolution of movable position detection is the value of stroke of sliding of upper rail divided by the number of reed switch. Accordingly, to achieve a highly accurate position detecting, it is necessary to use the reed switch as many as possible and this will lead to a very high cost structure. In addition, a large connecting space is required for provision of a plural number of reed switches and this will lead to a complex structure.

According to the patent document 2, a relative position sensor is disclosed which detects a displacement amount in response to the number of rotation from the operating point of time. Accordingly reading error or mechanical machining error is accumulated as the rotation goes on. This may worsen the accurate driving control. Further, every time the battery is removed or the current position is deleted from memory, resetting is required, but such resetting leads to a time consuming problem.

Further, according to the patent document 3, the device disclosed here has premises that the base point is memorized by computer under the seat being displaced to the base point position and accordingly, if the seat is moved when the computer is not operated, calibration is required again. Further, if this technology is applied to an electrically movable slide seat, since the slide lock holes are not used in such electrically operated seat and accordingly it is necessary to provide an exclusive use detecting target holes which may lead to increase of production cost.

Need thus exists for a provision of a position detecting device for a vehicle and a seat position detecting device which are compact in structure, low in production cost and which can always detect an absolute position moved from the reference point.

Means for Solving the Problem

In order to solve the above problems, according to the structural feature of the invention described in claim 1, a vehicular position detecting device detecting a position of a mobile object for the vehicle which is moved by a driving force of a rotary driving source includes a deceleration device having a two-stage hypo-cycloid mechanism decelerating the rotation amount of a rotation shaft rotated plural revolutions to one revolution or less by the driving source upon the mobile object being moved and a rotation sensor detecting a rotation output from the deceleration device as an absolute angle, wherein a position of the mobile object is detected based on the absolute angle detected by the rotation sensor.

According to the structural feature of the invention described in claim 2, the deceleration device according to claim 1 includes: an eccentric shaft connected to the rotation shaft and having a central axis de-centered from the rotation center of the rotation shaft; an eccentric rotation body supported on the eccentric shaft for relative rotation therewith; a housing rotatably supporting the eccentric shaft and accommodating the eccentric rotation body therein; a first stage hypo-cycloid mechanism having a first inner gear wheel provided coaxially with the rotation shaft in the inner peripheral portion of the housing and a first outer gear wheel formed on the eccentric rotation body with the number of tooth less than that of the first inner gear wheel by a small number and engaged with the first inner gear wheel; and a second stage hypo-cycloid mechanism having an output shaft rotatably supported on the housing and coaxial with the rotation shaft, a second inner gear wheel formed on and coaxial with the output shaft and arranged in parallel with the first inner gear wheel and a second outer gear wheel formed on the eccentric rotation body with the number of tooth less than that of the second inner gear wheel by a small number and engaged with the second inner gear wheel.

According to the structural feature of the invention described in claim 3, the rotation shaft according to claim 1 is a component of a driving force transmitting mechanism provided between the output shaft of the driving source and the mobile object for transmitting the driving force of the driving source to the mobile object.

According to the structural feature of the invention described in claim 4, the rotation shaft according to claim 1 is an output shaft of the driving source.

According to the structural feature of the invention described in claim 5, a seat slide device comprising: a position detecting device of claim 1, the position detecting device being provided to a seat slide including a lower rail adapted to be secured to a vehicle floor, an upper rail slidably supported by the lower rail and supporting a vehicle seat, a screw shaft rotatably supported on either one of the lower rail and the upper rail, a nut member engaged with the screw shaft and fixed to the other one of the lower rail and the upper rail and a motor as a driving source connected to the screw shaft through a transmitting mechanism and rotating the screw shaft whereby a vehicle seat slide device for relatively moving the lower rail and the upper with a certain amount, wherein the deceleration mechanism is disposed in either the screw shaft, the rotation shaft of the transmitting mechanism, or the output shaft of the motor, whereby a displaced position of the upper rail relative to the lower rail is detected.

According to the structural feature of the invention described in claim 6, a position detecting device for a vehicle for detecting a position of a mobile object for a vehicle which is movable between a starting end and a finishing end, includes a deceleration device for decelerating the rotation of the input shaft rotatably driven by the driving source to a rotation equal to or less than one rotation of the output rotation shaft upon moving the mobile object, a magnetic pole carrier, to which the output rotation from the output rotation shaft of the deceleration device is transmitted, magnetized so that the positive and the negative poles are alternately arranged in a rotation direction, a rotation restriction mechanism structured and including a contact portion provided on the magnetic pole carrier and a restriction portion provided on the housing on which the output rotation shaft is supported, wherein a rotation permissible angle from the condition that the contact portion is in contact with the restriction portion to the condition that the contact portion is rotated in the other direction to be in contact with the restriction portion is set to be larger than the rotation angle of the output rotation shaft thereby to restrict the rotation of the magnetic pole carrier by the contact between the contact portion and the restriction portion, a torque limiter mechanism for setting a rotation initiating angle position of the magnetic pole carrier which corresponds to the starting end by rotating the output rotation shaft in the one direction keeping the restriction portion to be in contact with the contact portion or for setting a rotation finishing angle position of the magnetic pole carrier which corresponds to the finishing end by rotating the output rotation shaft in the other direction keeping the restriction portion to be in contact with the contact portion and a magnetic sensor for detecting rotation angle of the magnetic poles of the magnetic pole carrier, whereby the position of the mobile object from the starting end or from the finishing end based on the rotation angle is detected by the magnetic sensor.

According to the structural feature of the invention described in claim 7, the output rotation shaft according to claim 6, is supported by the housing in parallel with the input shaft.

According to the structural feature of the invention described in claim 8, the deceleration device according to claim 6 includes a two stage hypo-cycloid mechanism.

The Effects of the Invention

According to the invention described in claim 1, the driving source is rotated in response to the moving stroke of the mobile object and accordingly the number of rotation of the rotation shaft rotated by the driving source becomes large. However, according to the invention, the rotation of the rotation shaft rotated by the driving source obtains a high deceleration ratio by the deceleration device having a two-stage hypo-cycloid mechanism and therefore, the rotation is decelerated to equal to or less than one revolution angle and is transmitted to the rotation sensor which can detect the absolute angle of 360 degrees or less. Therefore, the displacement amount from the reference point is always detected as an absolute position and accumulated reading errors or machining errors can be minimized to keep the high accuracy of driving control for the mobile object. Further, the two-stage hypo-cycloid mechanism can be made compact in structure and accordingly, a compact, down-sized, light-weight position detecting device for a vehicle can be installed in a vehicle.

According to the invention described in claim 2, the rotation of the rotation shaft is transmitted to the eccentric shaft and by the rotation of the eccentric shaft; the first outer gear wheel engages with the first inner gear wheel and rotates eccentrically therewith. The deceleration ratio of the first stage hypo-cycloid mechanism is defined by the ratio of gear tooth number difference between the first inner gear wheel and the first outer gear wheel relative to the tooth number of the first outer gear wheel. In this case, since the first outer gear wheel and the second outer gear wheel are integrally connected with each other, having one common eccentric shaft, the second outer gear wheel rotates with the same rotation speed with the eccentric rotation of the first outer gear wheel relative to the first inner gear wheel fixed to the housing. The second inner gear wheel engaging with the second outer gear wheel outputs rotation angle with a deceleration ratio of the second stage hypo-cycloid mechanism defined by the ratio of gear tooth difference between the second inner gear wheel and the second outer gear wheel relative to the number of gear tooth of the second inner gear wheel. By using the second stage hypo-cycloid mechanism, a large deceleration ratio can be obtained and accordingly, the detection can be made at the rotation shaft, the rotation number of which in response to the stroke of the mobile object for a vehicle is large. Further, the second inner gear wheel rotates coaxially with the first inner gear wheel and rotation can be directly inputted to the rotation sensor from the second inner gear wheel without providing a mechanism for returning the eccentric rotation to the rotation without eccentricity. Therefore, the number of parts can be reduced to provide a compact deceleration device. Further, using the two-stage hypo-cycloid mechanism which is simple in structure, position detecting for a vehicle can be achieved with low cost.

According to the invention described in claim 3, the absolute position of the mobile object for a vehicle can be detected using a large deceleration ratio from even a high rotation component such as a driving force transmitting mechanism provided between the output shaft of the driving source and the mobile object for the vehicle. The position detecting device for a vehicle can be disposed randomly at the best suited place in view of design, mechanism, space and maintenance.

According to the invention described in claim 4, since the number of rotation of the driving source can be effectively detected without loss and the device can be assembled accompanying with the attachment of a driving source which is easy to be attached or detached. Thus a post attachment of the vehicle detecting device for adjustment, such as, maintenance purpose or for improvements can be easily achieved.

According to the invention of claim 5, when the rotation is detected by the rotation of screw shaft, the rotation of screw shaft at final stage of sliding the seat is detected. Accordingly, the device can be used for a seat slide device with high accurate control by the detection with a very few error with the actual seat displacement amount.

Further, by detecting a seat displacement amount, the optimum rotation shaft can be selected from either one of the rotation shafts in the transmitting mechanism without having the restriction of low rotation speed and the freedom of design choice and performance ability can be improved when designing the seat slide device.

Further, when detecting from the motor, the motor is rotated according to the stroke of a predetermined relative movement between the lower and upper rails and thus the rotation amount of the output shaft rotated by the motor becomes large. However, according to the invention, the rotation of the output shaft rotated by the motor can obtain a high deceleration speed ratio by the deceleration device with a two stage hypo-cycloid mechanism and therefore, the rotation can be reduced to a rotation angle of one revolution or less and can be transmitted to a rotation sensor which can detect an absolute angle of 360 degrees or less. In this case, the rotation of motor can be effectively detected without loss and since the device can be assembled in accordance with the attachment of a driving source which is easy to be attached or detached, a post attachment of the vehicle detecting device for adjustment, such as, maintenance purpose or for improvements can be easily achieved.

According to the invention of claim 6, the input shaft is rotated by a driving of a driving source and during the vehicle mobile object moving up to the starting end, the magnetic pole carrier is rotated in one direction so that the contact portion of the magnetic pole carrier contacts with the restriction portion to restrict the rotation. Thereafter, until the vehicle mobile object reaches the starting end, the output rotation shaft idles relative to the magnetic pole carrier by the torque limiter mechanism. After the vehicle mobile object reached the starting end the position of the magnetic pole carrier is set to the rotation initiating angle position corresponding to the starting end. Thus this rotation angle at the rotation initiating angle position can be set to the referencing point and the moving position of the vehicle mobile object from the starting end can be detected by a magnetic sensor. After the magnetic pole carrier is set to the rotation initiating angle position, the vehicle mobile object is moved to the finishing end. The rotation angle of the output rotation shaft decelerated to one revolution or less is smaller than the rotation permissible angle and therefore, the contact portion does not contact with the restriction portion and the rotation initiating angle position corresponding to the starting end is not changed. Further, by moving the vehicle mobile object up to the finishing end, the magnetic pole carrier can be positioned to the rotation finishing angle position corresponding to the finishing end of the vehicle mobile object and thus the moving position of the vehicle mobile object from the finishing end can be detected by the magnetic sensor. Thus, when the single body performance characteristics of the magnetic sensor and the magnetic pole carrier are uniformly set in advance, the magnetic pole carrier can be positioned, as intended, to either the rotation initiating angle position or the rotation finishing angle position by just moving the vehicle mobile object to the starting end or to the finishing end. Accordingly, the seat position detecting device can be simply and with a short time assembled to the moving device of the vehicle mobile object without post process in which the electronic adjustment has to be carried out under a seat slide operation. Further, in case a part or component forming the slide mechanism is deviated and attachment or detachment for repairing is needed, the readjustment of the absolute position can be easily made in a repair factory.

According to the invention of claim 7, the output rotation can be transmitted to the magnetic pole carrier from the output rotation shaft provided in parallel with the input shaft and therefore, the magnetic sensor disposed opposite to the output rotation shaft can be provided at a position deviated from the center of axis of the input shaft. Even if it is difficult for the magnetic pole carrier to have an attachment space in an axial direction of the input shaft, attachment can be easily made.

According to the invention of claim 8, since the deceleration device has a two stage hypo-cycloid mechanism, a large deceleration speed ratio can be obtained and it is possible to easily detect the absolute position of the magnetic pole carrier by decelerating the rotation of the input shaft according to the stroke of the vehicle mobile object to one revolution or less of the output rotation shaft. Further, the two stage hypo-cycloid mechanism can be manufactured compact in structure and the vehicle position detecting device to be attached to the vehicle can be minimized in size and reduced in weight.

BRIEF EXPLANATION OF ATTACHED DRAWINGS

FIG. 1 indicates an exploded perspective view of a power seat slide device according to a first embodiment of the invention;

Figure 9:
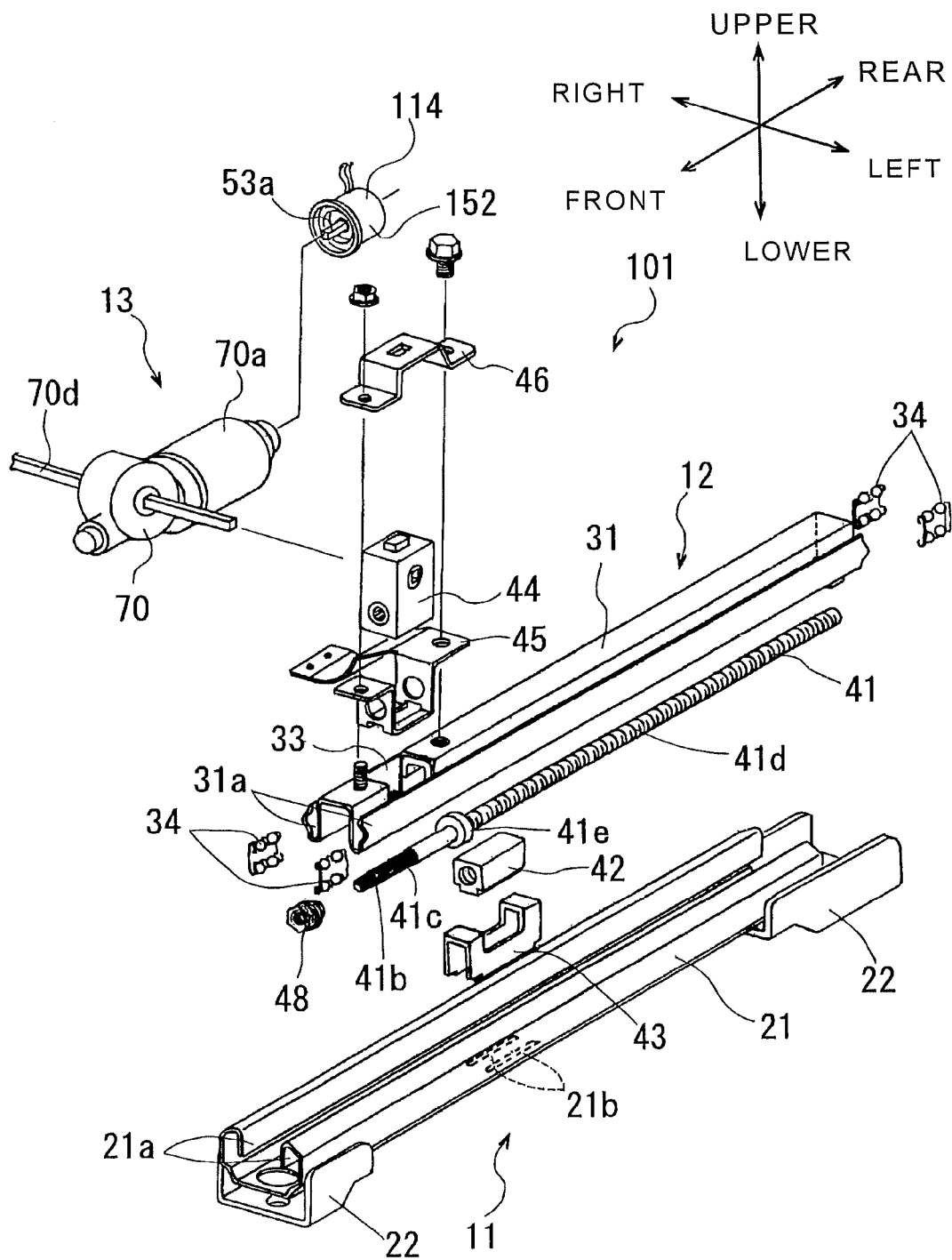
Figure 10:
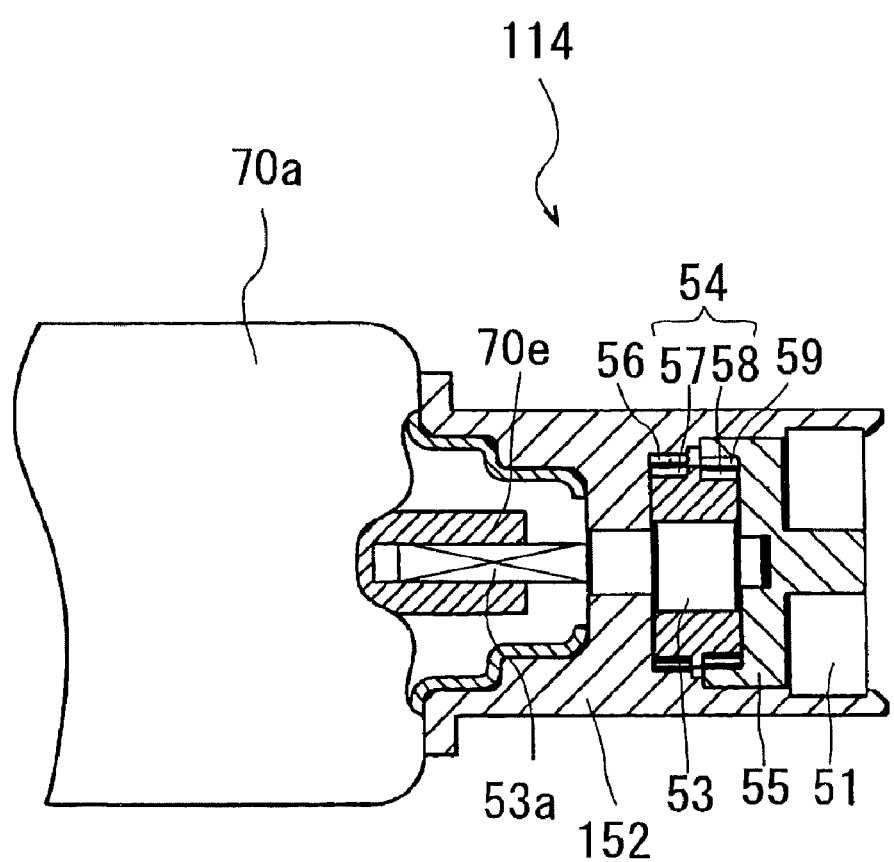
Figure 11:
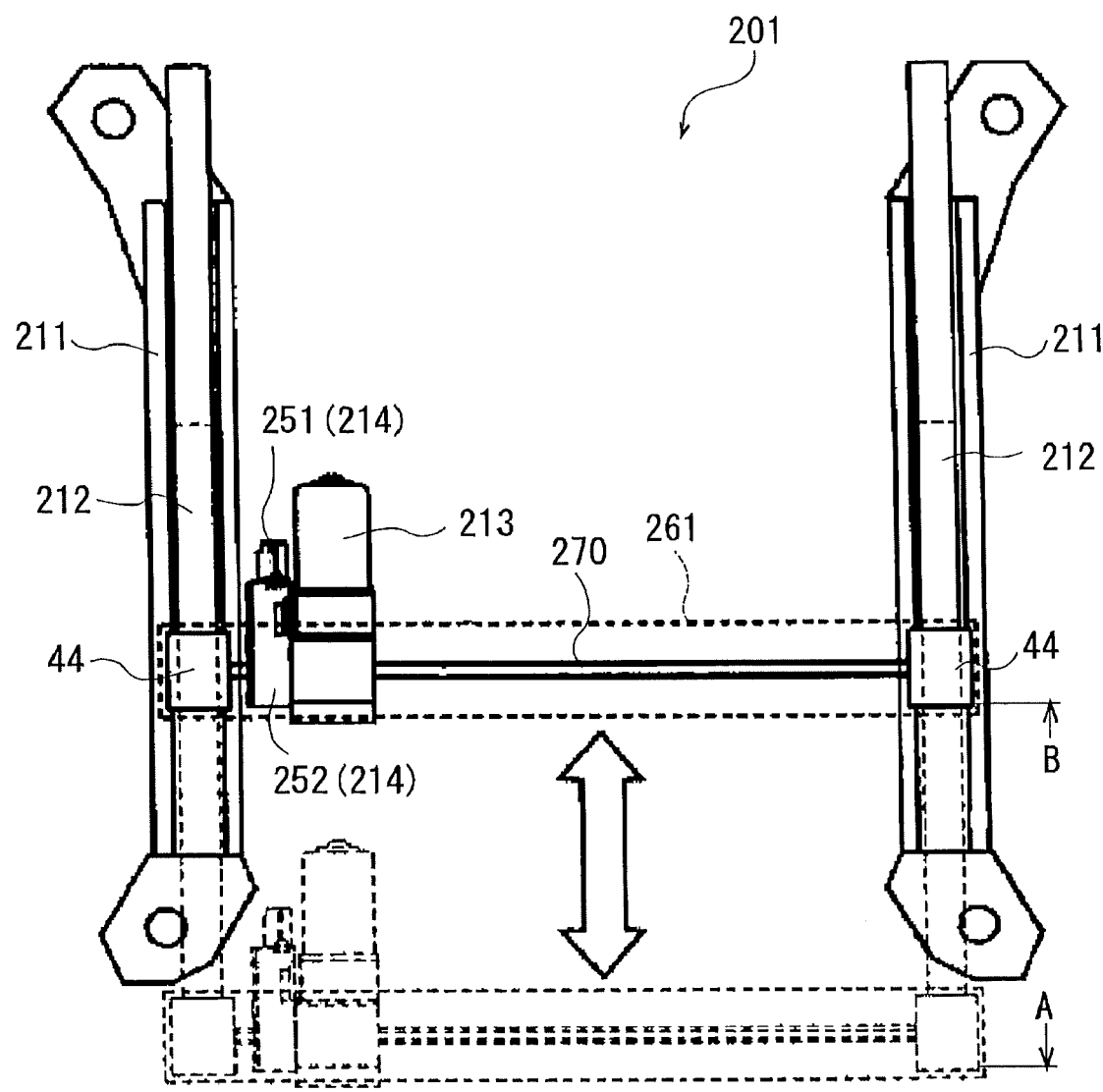
Figure 12:
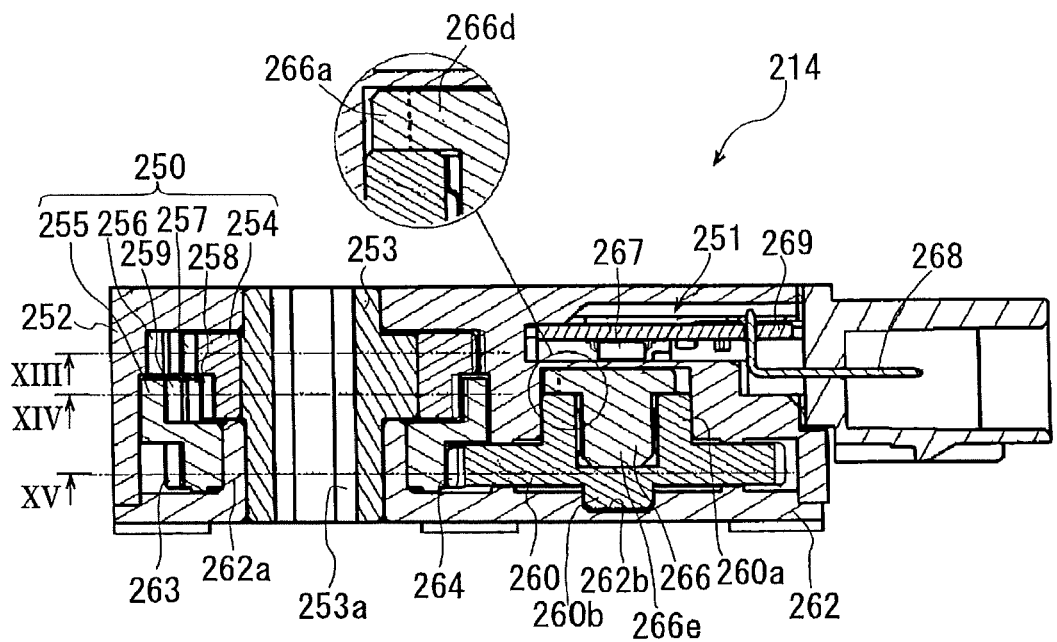
Figure 13:
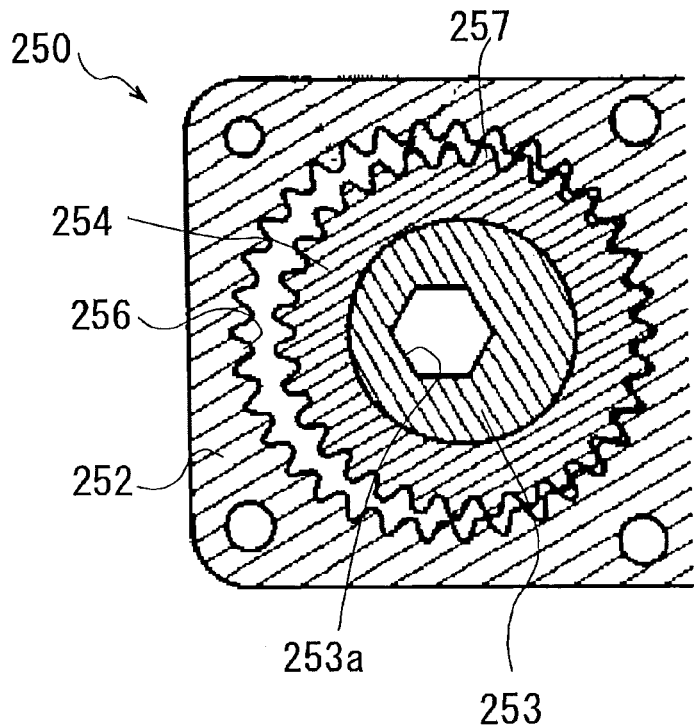
Figure 14:
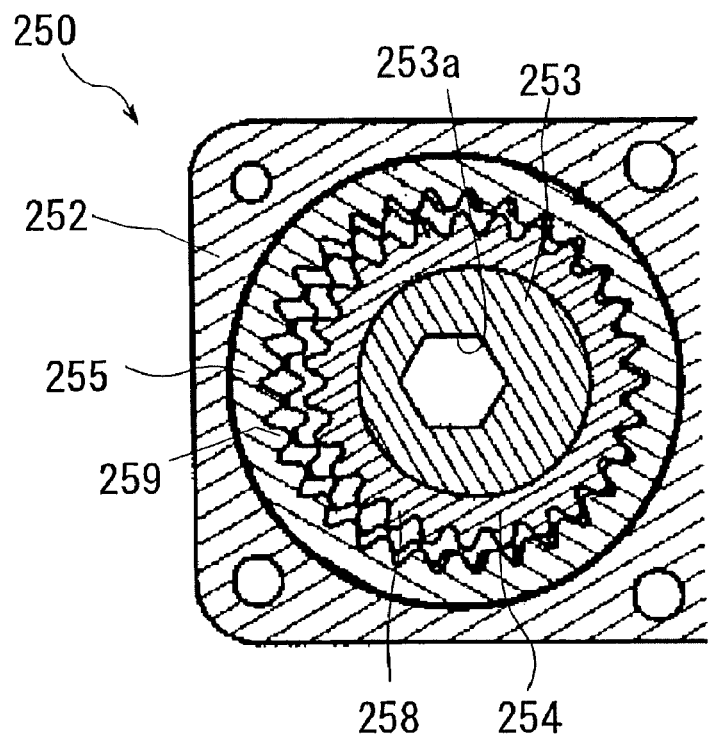
Figure 15:
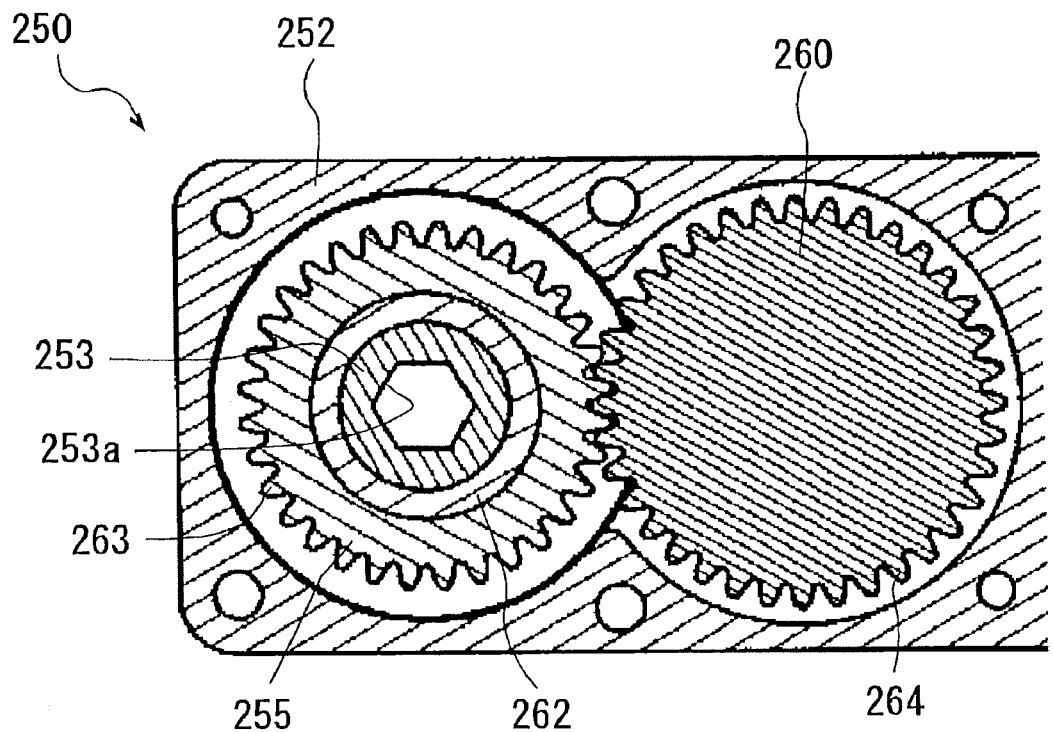
Figure 16:
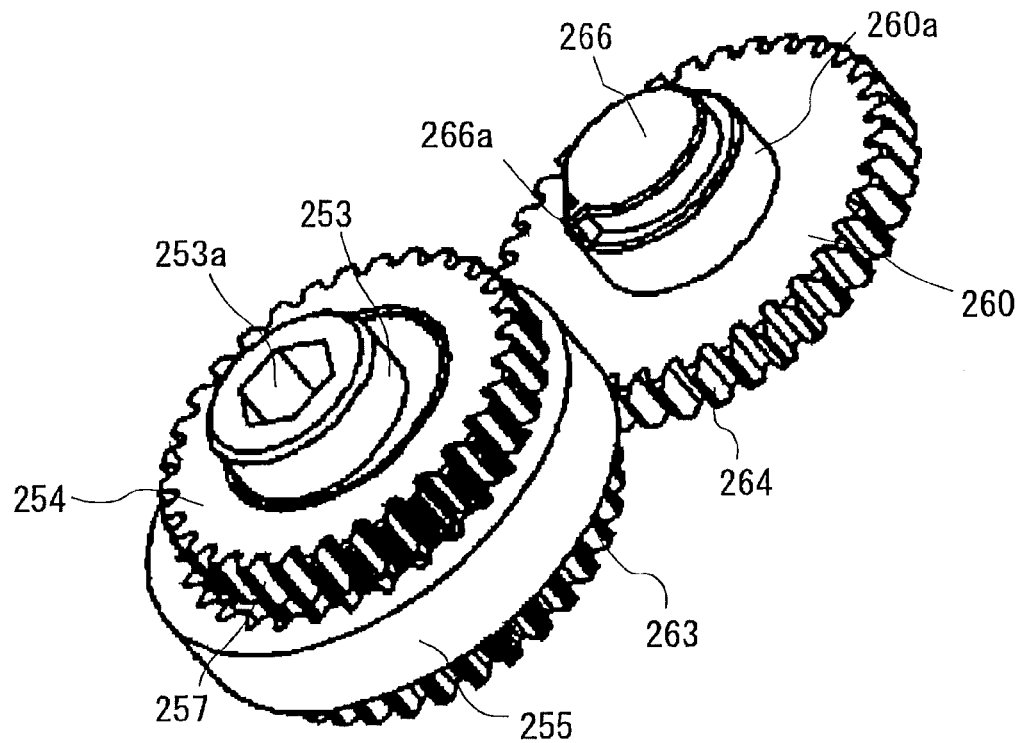
Figure 17:
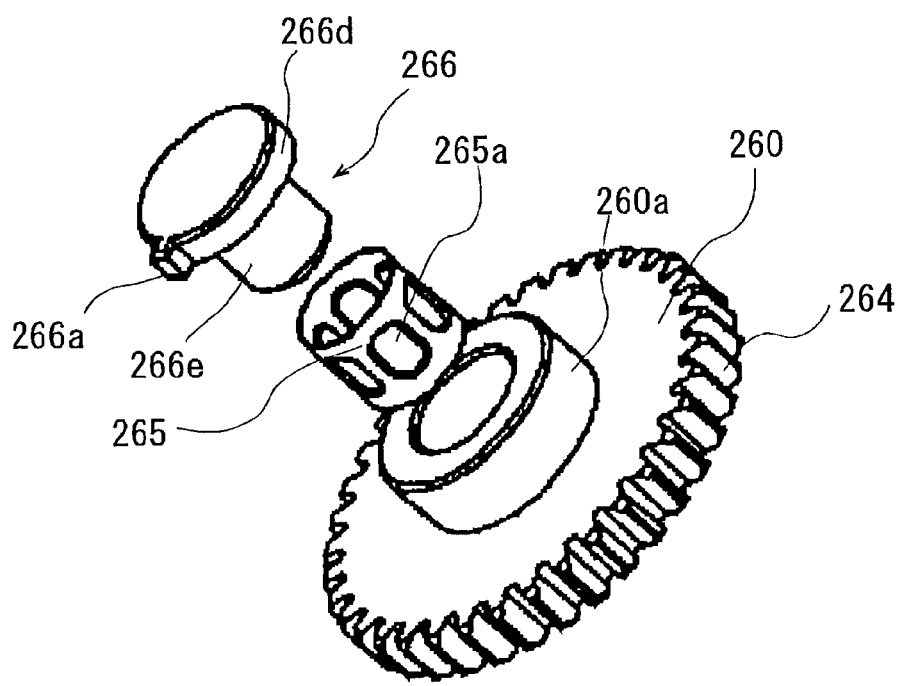
Figure 18:
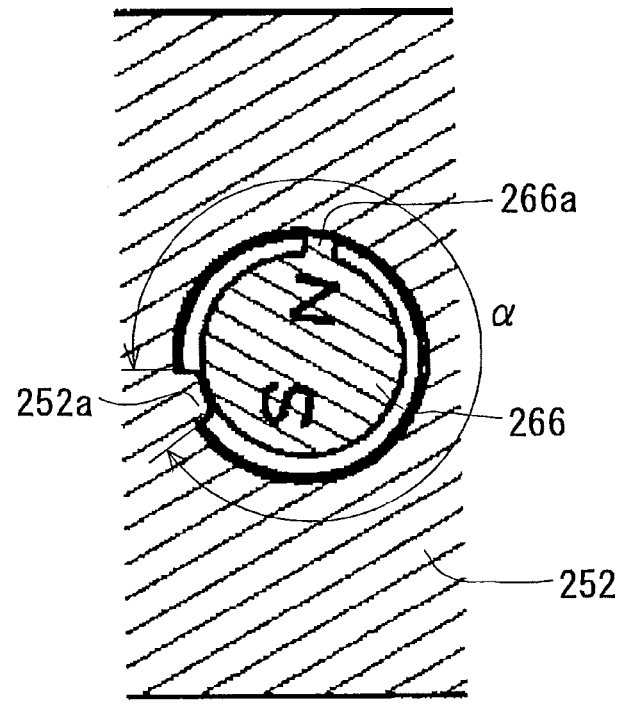
Figure 19:
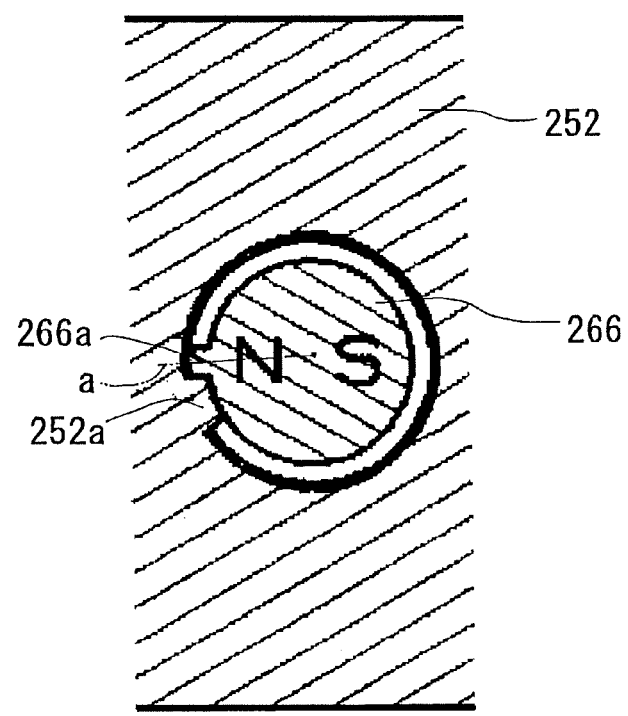
Figure 20:
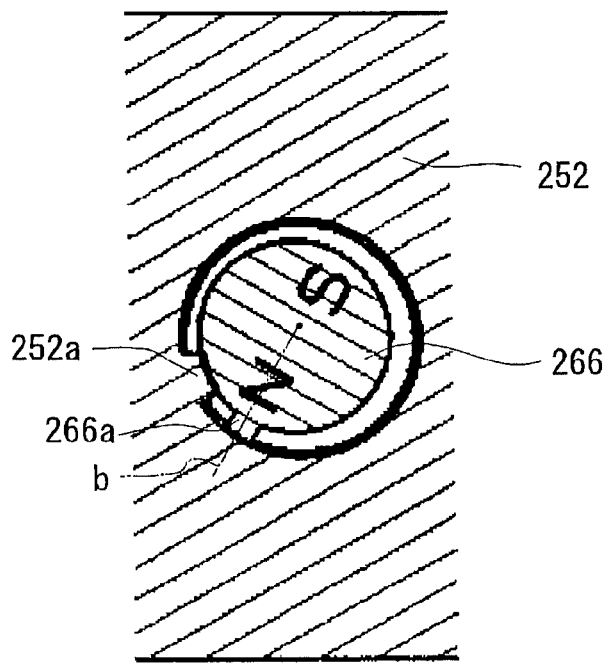
Figure 21:
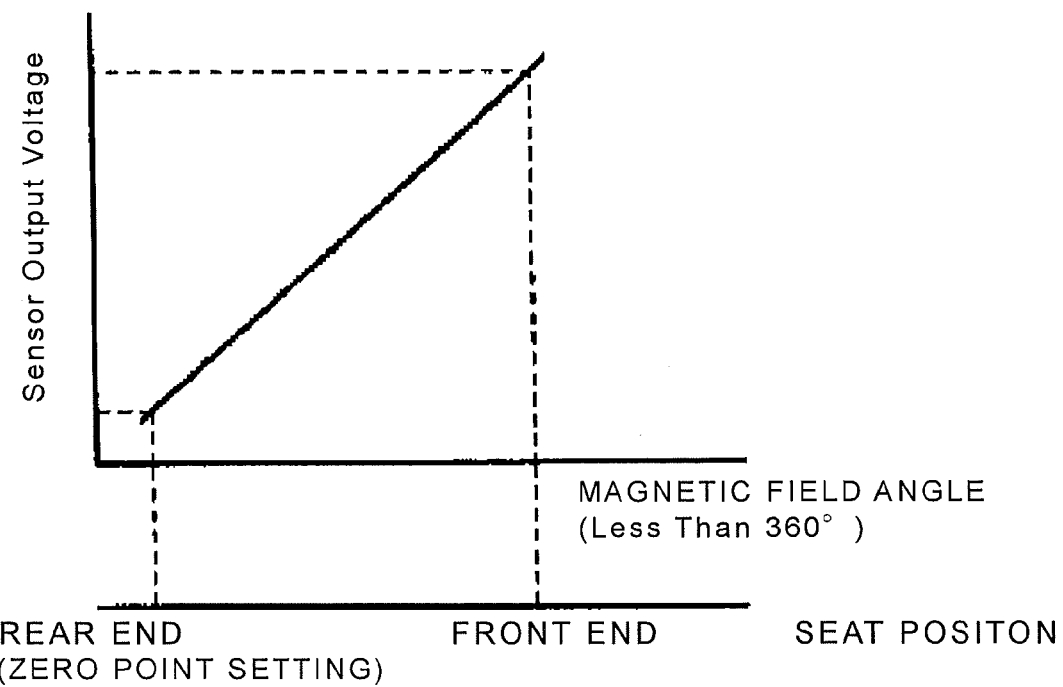

FIG. 9 indicates an exploded perspective view of a power seat slide device according to a second embodiment of the invention;

FIG. 10 is a cross sectional view of the seat position detecting device showing the condition assembled with the electric motor according to the second embodiment of the invention;

FIG. 11 is a plane view showing an outline of a power seat slide device according to a third embodiment of the invention;

FIG. 12 is a cross sectional view of a seat position detecting device according to the third embodiment of the invention;

FIG. 13 is a cross sectional view taken along the line XIII-XIII of FIG. 12 according to the third embodiment of the invention;

FIG. 14 is a cross sectional view taken along the line XIV-XIV of FIG. 12 according to the third embodiment of the invention;

FIG. 15 is a cross sectional view taken along the line XV-XV of FIG. 12 according to the third embodiment of the invention;

FIG. 16 is a perspective view of the first rotation output member and the second rotation output member according to the third embodiment of the invention;

FIG. 17 is an exploded perspective view of a magnetic shaft member of the second rotation output member and an idling mechanism according to the third embodiment of the invention;

FIG. 18 is a view showing magnetic poles of the magnetic shaft member according to the third embodiment of the invention;

FIG. 19 is a view showing an example of the rotation initiating angle position opposing to the starting end according to the third embodiment of the invention;

FIG. 20 is a view showing an example of the rotation position of the rotation projection reached the finishing end according to the third embodiment of the invention; and FIG. 21 is a liner graph showing the output voltage outputted from the magnetic field angle detecting element and the absolute position of the mobile object according to the third embodiment of the invention.

EXPLANATION OF NUMERALS IN THE DRAWINGS

Numeral 1 designates a seat slide device (power seat slide device), numeral 2; vehicle floor, numeral 3; mobile object for vehicle (vehicle seat), numeral 1; upper rail, numeral 12; lower rail, numeral 14; position detecting device for vehicle/seat position detecting device, numeral 41; rotation shaft/screw shaft, numeral 42; nut member, numeral 44; transmitting mechanism, numeral 50; deceleration device, numeral 51; rotation sensor (potentiometer), numeral 52; housing, numeral 53; eccentric shaft, numeral 54; eccentric rotation body, numeral 55; output shaft (rotation output member), numeral 56; first hypo-cycloid mechanism (first inner gear wheel), numeral 57; first hypo-cycloid mechanism (first outer gear wheel), numeral 58; second hypo-cycloid mechanism (second outer gear wheel), numeral 59; second hypo-cycloid mechanism (second inner gear wheel), numeral 70a; driving source/motor (electric motor), numeral 70e; rotation shaft/output shaft (engaging shaft), numeral 101; seat slide device (power seat slide device), numeral 114; seat position detecting device, numeral 152; housing, numeral 201; seat slide device (power seat slide device), numeral 212; mobile object for a vehicle (upper rail), numeral 213; driving source (driving device), numeral 214; position detecting device for vehicle (seat position detecting device), numeral 250; deceleration device, numeral 251; magnetic sensor numeral 252a; rotation restriction mechanism/restriction portion (contact portion), numeral 253; deceleration device (eccentric shaft), numeral 254; deceleration device (eccentric rotation body), numeral 255; deceleration device (first rotation output member), numeral 256; first hypo-cycloid mechanism (first inner gear wheel), numeral 257; first hypo-cycloid mechanism (first outer gear wheel), numeral 258; second hypo-cycloid mechanism (second outer gear wheel), numeral 259; second hypo-cycloid mechanism (second inner gear wheel), numeral 260; output rotation shaft (second rotation output member), numeral 260a; torque limiter mechanism (cylinder portion), numeral 265; torque limiter mechanism (ring spring), numeral 266; magnetic pole carrier, numeral 266a; rotation restriction mechanism/contact portion (rotation projection), numeral 266e; torque limiter mechanism (shaft portion), numeral 270; input shaft (connecting rod), symbol A; starting end, symbol B; finishing end, symbol a; rotation initiating angle position, symbol b; rotation finishing angle position, symbol a; rotation permissible angle.

THE BEST MODE EMBODIMENTS OF THE INVENTION

Figure 1:
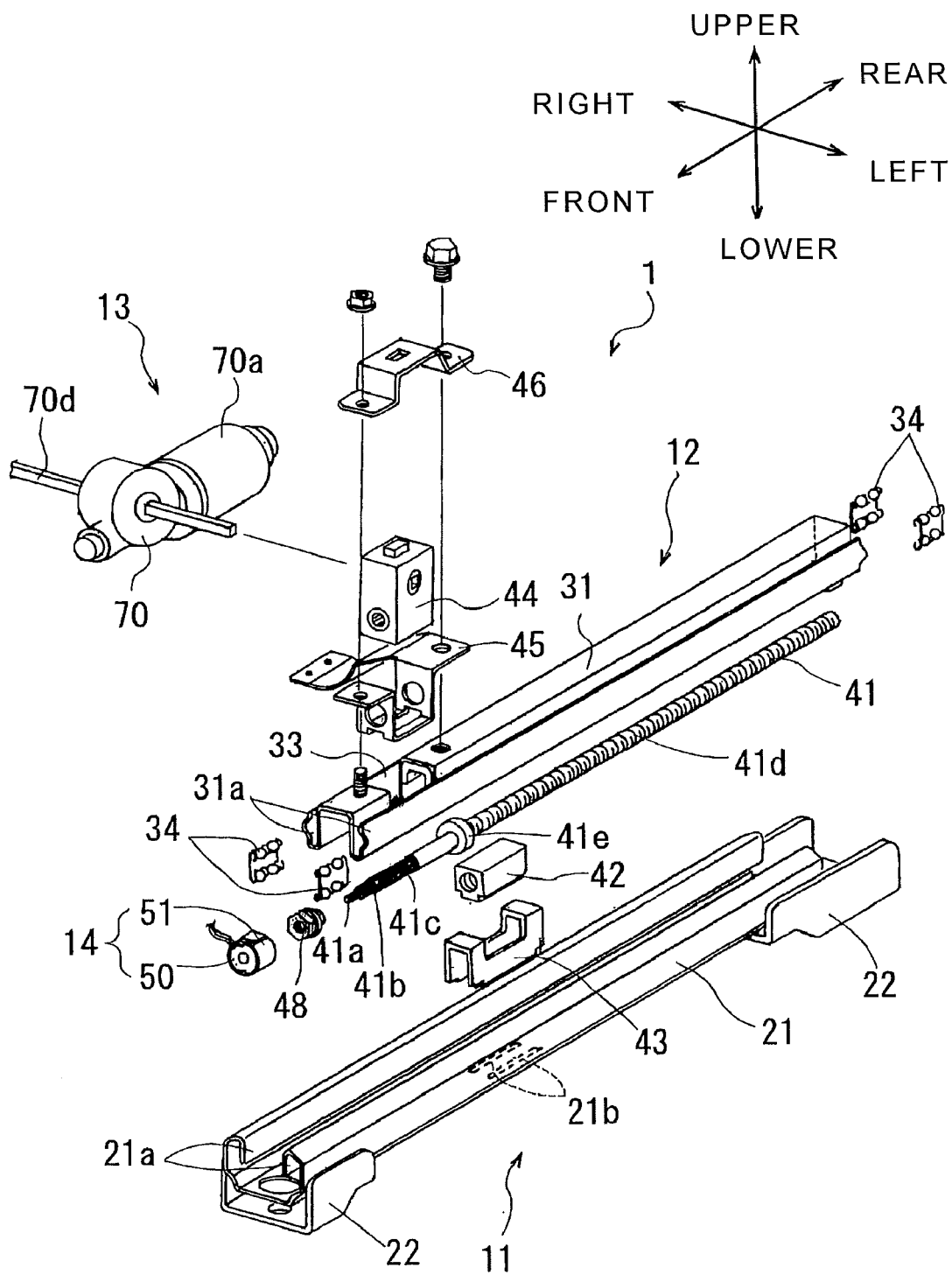
Figure 2:
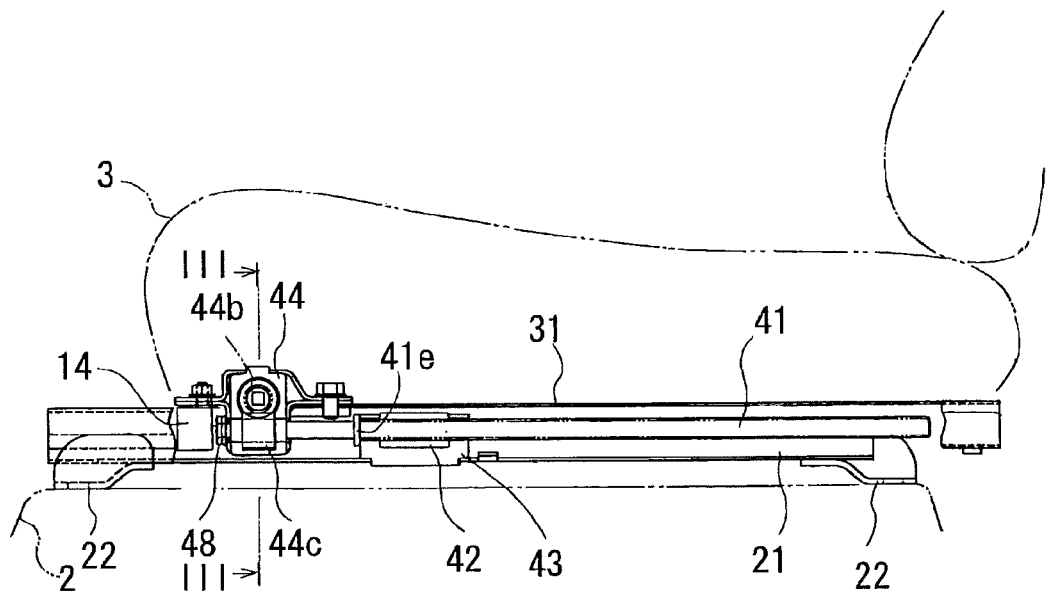
FIG. 2 is a cross sectional view showing the power seat slide device according to the first embodiment under the condition that the device is installed in a vehicle.

The first embodiment, in which the position detecting device for a vehicle according to the invention is applied to a seat position detecting device for a power seat slide device as a seat slide device will be explained hereinafter. FIG. 1 is an exploded perspective view of the power seat slide device and FIG. 2 is a cross sectional view of the power seat slide device installed in a vehicle. It is noted here that the words indicating directions "front and rear, right and left and upper and lower" used in the specification are described as a basis of the vehicle direction and the arrows indicating "front and rear, right and left and upper and lower" in the drawings indicate the directions of the power seat slide device installed in the vehicle.

The power seat slide device 1 is mainly formed by a lower rail 1, an upper rail 12, a driving device 13 and a seat position detecting device 14 as a position detecting device as shown in FIG. 1 and FIG. 2.

The lower rail 1 is formed by a lower rail main body 21 and a floor fixing portion 22. The lower rail main body 21 is an elongated member extending in a vehicle front/rear direction and formed by a pair at right and left sides. The lower rail main body 21 has an approximately U-shape in cross section and a pair of flange portions 21a is formed at both upper ends of the side walls forming the U-shape and bent inwardly like a turned-back. The floor fixing portion 22 is secured to the lower rail main body 21 through rivets (not shown) at front and rear ends of the main body 21. The lower rail main body 21 is fixed to the vehicle floor 2 through the floor fixing portion 22.

The upper rail 12 is formed by an upper rail main body 31, a seat fixing portion (not shown) and a bracket fixing portion 33. The upper rail main body 31 is an elongated member extending in a vehicle front/rear direction and formed by a pair at right and left sides corresponding to the lower rail main body 21. The upper rail main body 31 has an approximately reverse U-shape in cross section and a pair of flange portions 31a is formed at both lower ends of the side walls forming the reverse U-shape and bent outwardly like a turned-back. The cross sectional shape of the upper rail main body 31 is formed with the engageable flange portions 31a within a space formed by the flange portion 21a of the lower rail main body 21 and the side walls of the lower rail main body 21 and the upper rail main body 31 and the lower rail main body 21 are assembled to be relatively movable in a front/rear direction, each flange portion 21a and 31a being engaged. The seat fixing portion (not shown) is screwed at the upper portions of front and rear ends of the upper rail main body 31. The upper rail 31 and the vehicle seat 3 are assembled through the seat fixing portion.

The driving mechanism 13 is mainly formed by a screw shaft 41, a nut member 42 screwed with the screw shaft 41, a gear device 44 and a driving deceleration gear device 70.

The screw shaft 41 is formed, in order from the front side, with a first serration portion 41a engaged with a later described eccentric rotation body, a male screw portion 41b screwed with a nut 48, a second serration portion 41c engaged with a later described output gear 44c and a feeder screw portion 41d engaged with the later described nut member 42. A contact flange portion 41e is circumferentially provided at the front end of the feeder screw portion 41d to be contact with a later described engaging member 43. The screw shaft 41 is provided in an inner space formed by the upper rail main body 31 and the lower rail main body 21 in a longitudinal direction relative to the rails and the front end of the screw shaft 41 is rotatably supported by the upper rail main body 31 through a later described bracket 45 or the like.

The nut member 42 engaging with the feeder screw portion 41d of the screw shaft 41 is made of a resin material, such as a resin formed by 66-nylon resin added with a glass fiber and the nut member 42 is held by the engaging member 43 assembled to the bottom wall of the lower rail main body 21. The engaging member 43 is formed by a plate bent to form a reverse U-shape in cross section and the upper central portion is recessed and the nut member 42 with a cuboids shape is inserted into the recessed portion to be fixed. The lower end of the engaging member 43 is inserted into the fixing groove 21b formed at he bottom wall surface of the lower rail main body 21 to be fixed. The front end of the engaging member 43 is in contact with the contact flange portion 41e of the screw shaft 41 to restrict the upper rail main body 31 from rearward movement.

Figure 3:
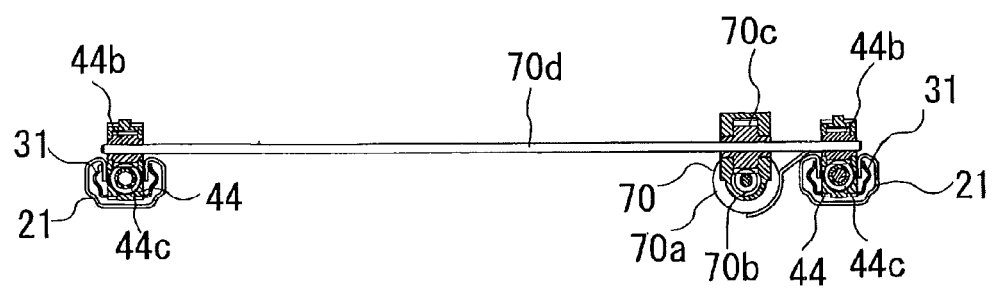
FIG. 3 is a cross sectional view taken along the line III-III of FIG. 2 according to the first embodiment.
Figure 4:
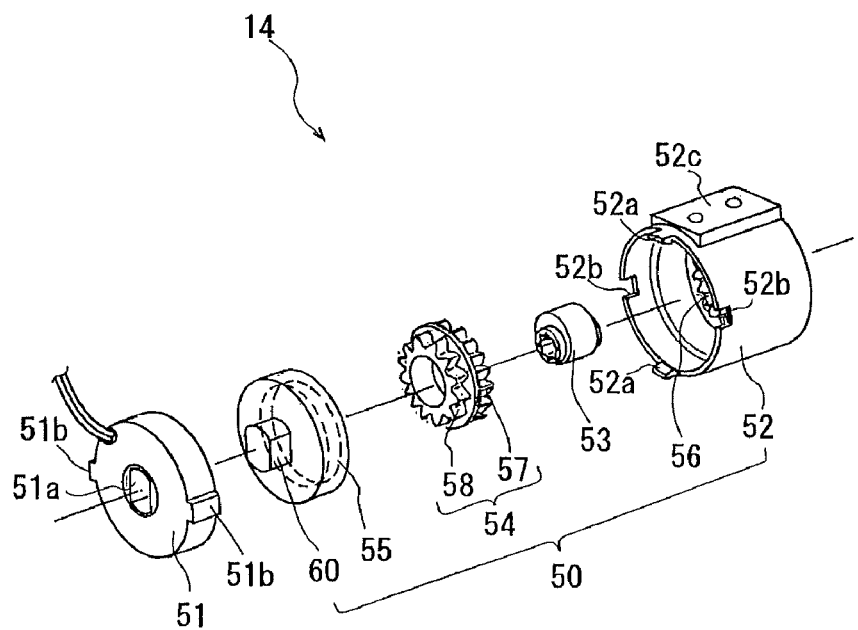
FIG. 4 is an exploded perspective view of a seat position detecting device according to the first embodiment.

The gear device 44 includes as shown in FIGS. 2, 3 and 4, a gear box 44a, an input gear 44b and an output gear 44c. Both gears 44b and 44c are formed with a gear wheel having a helical or torsion angle of 45 degree and are assembled into the gear box 44a so as to be engaged with each rotation shaft intersecting with the angle of 90 degrees. The gear box 44a is supported by a pair of brackets 45 and 46 and is fixed to the front end of the upper rail main body 31. The front end of the screw shaft 41 is penetrating through the gear box 44a and the second serration portion 41c of the screw shaft 41 is engaged with the output gear 44c within the gear box 44a, not allowing the relative rotation therewith. The screw shaft 41 is prevented from loosening from the gear box 44a by the nut 48 engaging with the male screw portion 41b.

The driving deceleration gear device 70 includes an electric motor 70a, worm gear 70b, worm wheel 70c and a connecting rod 70d and the worm gear 70b rotates integrally with the rotation shaft of the electric motor 70a and the worm wheel 70c transmits rotation of the worm gear 70b to the connecting rod 70a with a reduction speed. The connecting rod 70d is connected to the input gears 44b of the right and left gear devices 44, respectively and the rotation force based on the driving of the electric motor is transmitted to the input gears 44b. The transmitting mechanism is formed by the driving deceleration gear device excluding the electric motor 70a and the gear device 44.

Figure 5:
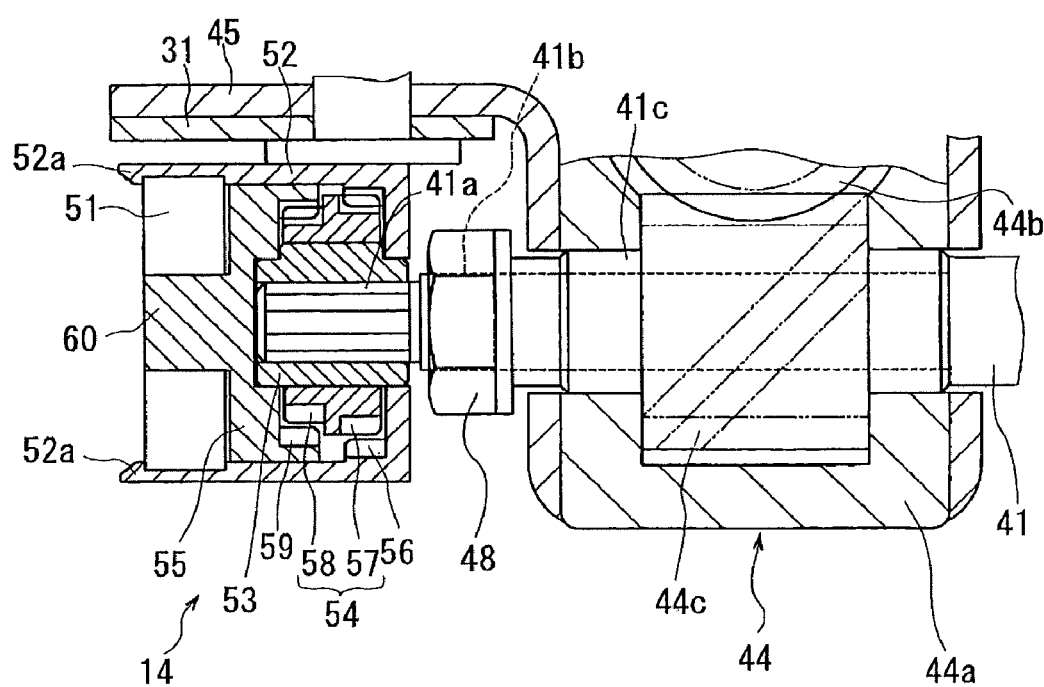
FIG. 5 is a cross sectional view of the seat position detecting device showing the condition assembled with the screw shaft according to the first embodiment of the invention.
Figure 6:
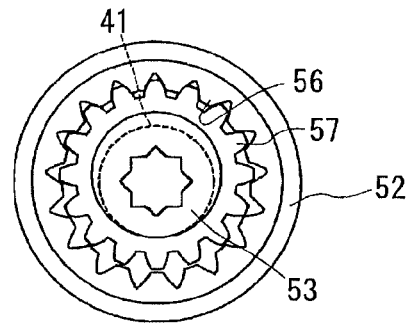
FIG. 6 is a view showing a first hypo-cycloid mechanism according to the first embodiment of the invention.
Figure 7:
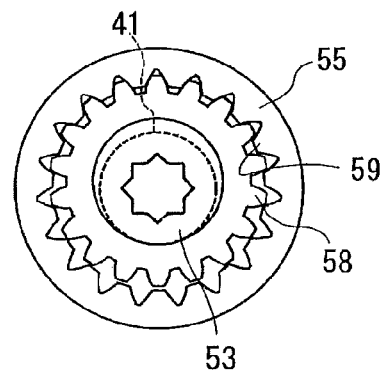
FIG. 7 is a view showing a second hypo-cycloid mechanism according to the first embodiment of the invention.
Figure 8:
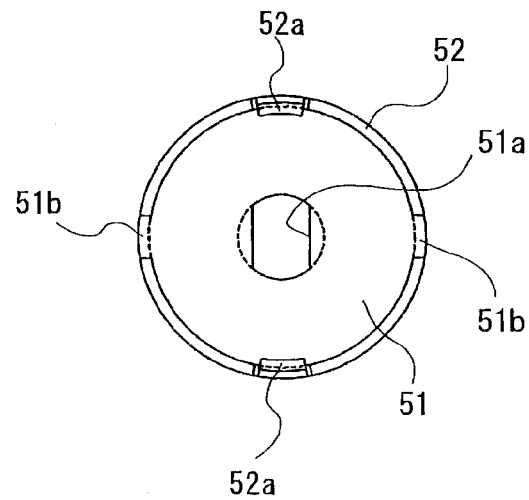
FIG. 8 is a view showing a potentiometer according to the first embodiment of the invention.

The seat position detecting device 14 is provided with the deceleration device 50 having a two stage hypo-cycloid mechanism and a single rotation type potentiometer 51 as a rotation sensor and is connected to the front end of the screw shaft 41 to detect the rotation of the screw shaft 41. The deceleration device 50 is structured by the housing 52 fixed to the upper inside wall of the upper rail main body 31, the eccentric shaft 53, the eccentric rotation body 54 and the rotation output member 55 as shown in FIGS. 4 and 5. The housing 52 is cylindrically formed and, as shown in FIGS. 5 and 6, the first inner gear wheel 56 is formed at the rear side inner peripheral portion and a pair of engaging pawls 52a is provided at the front end in a vertical direction and also a pair of engaging recesses is provided for inserting the later described potentiometer in a right/left direction. Further, the housing 52 is fixed to the upper inner wall of the upper rail main body 31 at the fixing portion 52c formed at the upper portion of the upper rail main body through bolts or the like (not shown). The eccentric shaft 53 is rotatably supported on the housing 52 at the rear end outer peripheral portion. The eccentric shaft 53 is inserted in the first serration portion 41a of the screw shaft 41, not allowing relative movement therewith and the shaft 53 includes a center shaft deviated from the rotation center of the screw shaft 41. The eccentric rotation body 54 is formed with the first outer gear wheel 57 (Refer to FIG. 6) and the second outer gear wheel 58 (Refer to FIG. 7) integrally formed in parallel as shown in FIGS. 4 and 5. The eccentric rotation body 54 is fitted into the eccentric shaft 53 to be relatively rotated therewith and is rotated eccentrically in response to the rotation of the eccentric shaft 53. The eccentric rotation body 54 is relatively rotatably supported on the inner peripheral portion of the later described rotation output member 55 at the front outer peripheral portion. The first outer gear wheel 57 and the first inner gear wheel 56 are mutually engaged with a small tooth number difference to form a first stage hypo-cycloid mechanism. (Refer to FIG. 6).

As an output shaft, the rotation output member 55 is rotatably fitted into the front end portion of the housing 52 and the rotation center of the rotation output member 55 is arranged coaxially with the first inner gear wheel 56 (coaxial with the screw shaft 41). The rotation output member 55 is cylindrically formed with a closed front end and an output engaging portion 60 is provided at the front end. The second inner gear wheel 59 is formed at the inner peripheral portion at the rear side and mutually engaging with the second outer gear wheel 58 with a small tooth number difference to form a second stage hypo-cycloid mechanism. (Refer to FIG. 7). The output engaging portion 60 is inserted into the front end of the housing 52 and engages with a detecting portion 51a of the potentiometer 51 and the potentiometer 51 is inserted into the front end of the housing and is engaged with the housing by a pair of engaging projections 51b. The potentiometer 51 detects the absolute position by measuring the rotation angle equal to or less than 360 degrees from the reference position and further detects the absolute position where the upper rail 31 has slid.

According to the power seat slide 1 as structured above, the sliding operation of the vehicle seat is performed as follows: first, the electric motor 70a is driven and the rotation of the electric motor 70a is decelerated by the driving deceleration gear device 70. Then the rotation is transmitted to the connecting rod 70d which penetrates the worm wheel 70c as an output side of the driving deceleration gear device 70. Thus when the connecting rod 70d is rotated, the input gears 44b of the right and the left gear devices 44 connected to the connecting rod are rotated. Further, when the screw shaft 41 connected to the output gears 44c of the gear device 44 is rotated, the relative rotation between the feeder screw portion 41d of the screw shaft 41 and the nut member 42 is converted into the displacement of relative position in an axial direction. Since the nut member 42 is fixed to the lower rail main body 21, the screw shaft 41 is relatively moves in a front/rear direction relative to the nut member 42. Thus, the upper rail main body 31 is slidably moved by a predetermined value relative to the lower rail main body 21.

Here, since the eccentric shaft 53 of the seat position detecting device 14 is connected to the screw shaft 41, the eccentric shaft 43 is rotated in response to the rotation of the screw shaft. When the eccentric shaft 43 is rotated the first outer gear wheel 57 is rotated being in internal contact with the first inner gear wheel 56 provided in the housing 52. At this time, the first outer gear wheel 57 is rotated more than the first inner gear wheel 56 by the tooth number difference. In this case, the number of tooth of the first outer gear wheel 57 relative to the tooth number difference is the speed ratio. In this embodiment, the first inner gear wheel 57 is fixed to the housing 52 in the first hypo-cycloid mechanism, and therefore, the first outer gear wheel 57 rotates by the tooth number difference with the first inner gear wheel 56, while the eccentric shaft 53 is rotated 360 degrees (one revolution). The tooth number of the first outer gear wheel 57 relative to the tooth number difference is the speed ratio (gear ratio).

As similar to the first hypo-cycloid mechanism, in the second hypo-cycloid mechanism, the second inner gear wheel 59 rotates more than the second outer gear wheel 58 by the tooth number difference and the tooth number of the second inner gear wheel 59 relative to the tooth number difference is the speed ratio (gear ratio). Here, the speed ratio of the second inner gear wheel 59 at output side relative to the rotation speed of the eccentric shaft 53 at the input side is as follows: $(Z21 \times Z12 - Z11 \times Z22)/(Z21 \times Z12)$ Wherein Z11 represents the number of tooth of the first inner gear wheel 56, Z12 represents the tooth number of the first outer gear wheel 57, Z21 represents the tooth number of the second inner gear wheel 59, and Z22 represents the tooth number of the second outer gear wheel 58. For example, assuming that the lead length of the feeder screw portion 41d being 4 mm and the slide amount of the upper rail main body 31 being 260 mm, the total rotation number of the screw shaft 41 is calculated as 260/4=65. When considering the deceleration speed ratio of 152, the rotation number is calculated as 65/152=0.428, which is smaller than one revolution. Thus one revolution or less can be outputted and the value can be detected by the potentiometer 51. If a sensor, such as the potentiometer 51 that can detect the absolute angle, is used, the absolute position in which the upper rail main body 31 has slid, can be detected.

Thus, according to thus structured seat position detecting device 14, the rotation of the screw shaft 41 rotating by the electric motor 70a as a driving source, can be decelerated to a rotation angle equal to or less than one revolution by using the deceleration device 50 having a two stage hypo-cycloid mechanism (56, 57, 58 and 59) and is transmitted to a potentiometer 51 which can detect the absolute angle of 360 degrees or less. This can always detect the displacement amount as the absolute position from the reference point and accordingly, error accumulation or mechanical error accumulation can be avoided to keep the high accuracy of the driving control for the power seat slide device 1.

Further, since the first outer gear wheel 57 and the second outer gear wheel 58 are integrally formed having the eccentric shaft 53 as a common shaft, the second outer gear wheel 58 is eccentrically rotated with the same eccentric rotation as the first outer gear wheel 57. The second inner gear wheel 59 engaging with the second outer gear wheel 58 can be coaxially rotated with the first inner gear wheel 57 and no mechanism for returning the eccentric rotation to the rotation without eccentricity is needed and the rotation can be directly transmitted to the rotation sensor from the second inner gear wheel 59. This will enable the reduction of parts and can provide a detecting device with compact structure. Further, by using the two stage hypo-cycloid mechanism, a large deceleration ratio can be obtained to detect the rotation from the rotational shaft with a large number of rotations in response to the slide stroke. According to the embodiment, since the rotation of the screw shaft 41 at the final stage of sliding operation of the vehicle seat 3 can be detected, the erroneous difference between the displacement amount of the actual vehicle seat 3 and the detected amount can be minimized so that the detecting device can be adopted to the power seat slide device 1 which needs a high accurate control.

Next, the second embodiment of the invention will be explained wherein the position detecting device for vehicle according to the invention is applied to the seat position detecting device for the power seat slide device. As shown in FIG. 9 and FIG. 10, the power seat slide device 101 according to the embodiment is different in construction from the embodiment in one point that the seat position detecting device 114 is directly connected to the rear side of the electric motor 70a and in the other point that the screw shaft 41 does not have the first serration portion at the tip end. The other constructions are the same with the first embodiment and therefore, the same reference numerals are given to the same components and the explanations thereof are omitted. As shown in FIG. 10, a housing 152 is provided at the rear end of the electric motor 70a in series therewith and a rotation shaft 53a to be engaged provided at the rear end of the eccentric shaft 53 is engaged with an engaging shaft 70e directly connected to a rotor of the electric motor 70e. By the eccentric rotation of the eccentric shaft 53, the eccentric rotation body 54 is eccentrically rotated to rotate the rotation output member 55 so that the rotation of the electric motor 70a is directly detected at the potentiometer 51.

For example, assuming that the deceleration ratio of the driving deceleration gear device being 10, and the full stroke rotation of the screw shaft being 65, the electric motor 70a can be rotated with the number of rotation "65×10=650". In this case, for example, assuming that the tooth number Z11 of the first inner gear wheel 56 to be Z11=30, the tooth number Z12 of the first outer gear wheel 57 to be Z12=29, the tooth number Z21 of the second inner gear wheel 59 to be Z21=29, the tooth number Z22 of the second outer gear wheel 58 to be Z22=28, applying these values to the equation described earlier, the rotation ratio of 1/841 can be obtained, i.e., the deceleration ratio of 841 can be obtained. This value is larger than the number of rotation 650 of the electric motor 70a. Thus the number of rotation of the second inner gear wheel 59 at the output side is equal to or less than one revolution.

According to the seat position detecting device 114 of the above structure, the rotation number of the electric motor 70a can be effectively detected without loss and since the device can be assembled accompanying with the attachment of a driving source which is easy to be attached or detached. Thus a post attachment of the vehicle detecting device for adjustment, such as, maintenance purpose or for improvements can be easily achieved.

The third embodiment of the invention will be explained. The position detecting device for a vehicle according to the invention is applied to the seat position detecting device of the power seat slide device in this third embodiment. FIG. 11 is a plane view of a schematically illustrated power seat slide device 201 provided on the vehicle floor 2. FIG. 12 is a cross sectional view of a schematically illustrated seat position detecting device 214. According to this embodiment, the seat position detecting device 214 is provided on the connecting rod 270 which transmits driving force to the pair of right and left upper rail 212 together with the driving device (electric motor) 213 as a driving source. This connecting rod 270 is formed with a hexagonal shape in cross section. The position where the upper rail 212 is slidably moved to the front most position is defined as a starting end A and the position where the upper rail 212 is slidably moved to the rear most position is defined as a finishing end B. The upper rail 212 is integrally fixed to the vehicle seat and the upper rail 212 is movable relative to the lower rail 211. In this embodiment, the upper rail 212 forms as the mobile object for a vehicle.

This seat position detecting device 214, as shown in FIG. 12, includes a deceleration device 250 decelerating the number of rotation of the connecting rod 270, a second rotation output member 260 as an output rotation shaft transmitting the output from the deceleration device 250 to the later described magnetic sensor 251 and a magnetic sensor 251 including the magnetic field angle detecting element 267.

As shown in FIGS. 11 and 12, the deceleration device 250 includes a cover member 261 covering the connecting rod 270 connecting between the pair of upper rails 212 or a housing main body 252 forming a housing connected and fixed to the driving device (electric motor 213) and a cover body 262, an eccentric shaft 253, an eccentric rotation body 254 and the first rotation output member 255. The connecting rod 270 forms the input shaft of the deceleration device 250. As shown in FIG. 12, the housing body 252 is formed with a rectangular box shape with the left side (lower side in FIG. 12) being open. The first inner gear wheel 256 is formed inner peripheral portion at right front portion (left side as viewed in FIG. 12) of the housing main body 252 and the cover body 262 is inserted into the housing at front side (left side as viewed in FIG. 12). Outer peripheral portion at left side (lower end in FIG. 12) of the eccentric shaft 253 is pivoted by the front side (left side in FIG. 12) of the cover body 252 and the eccentric shaft 253 a hexagonal hole 253a is formed at the eccentric shaft 253 and the connecting rod 270 extending in a right/left direction as viewed in FIG. 11 is inserted into the hexagonal hole with non-relative rotation. The eccentric shaft 253 has a central shaft deviated from the rotation center of the connecting rod 270. The eccentric rotation body 254 is integrally formed with the first outer gear wheel 257 and the second outer gear wheel 258 both being arranged in parallel. (FIG. 12). The eccentric rotation body 254 covers the outer periphery of the eccentric shaft 253 for relative rotation therewith and eccentrically rotates according to the eccentric rotation of the eccentric shaft 253. The first outer gear wheel 257 and the first inner gear wheel 256 are in mesh with each other with a small tooth number difference to form the first hypocycloid mechanism (Refer to FIG. 13). The first rotation output member 255 is rotatably inserted into the bearing support portion 262a projecting from the cover body 262 of the housing at the left end (lower end in FIG. 12) and the first output outer gear wheel 263 is formed at the outer peripheral portion at the left end of the first rotation output member 255. The second output inner gear wheel 259 is formed at the inner peripheral portion at the right end (upper end of inner peripheral portion in FIG. 12). The second inner gear wheel 259 and the second outer gear wheel 258 are in mesh with each other with a small tooth number difference to form the second hypo-cycloid mechanism (Refer to FIG. 14). The rotation center of the rotation output member 255 is coaxial with the first inner gear wheel 256 of the housing main body 252 (coaxial with the connecting rod). The first rotation output member 255 and the second rotation output member 260 are provided in parallel and the second output outer gear wheel 264 is formed on the outer peripheral portion of the second rotation output member 260 and is engaged with the first output outer gear wheel 263. (Refer to FIGS. 15 and 16). This second rotation output member 260 forms the output rotation shaft. The second rotation output member 260 rotates centering on the axial line in parallel with the rotation axis (rotation shaft of the connecting rod 270) of the first rotation output member 255. The second rotation output member 260 is provided with a cylinder portion 260a projecting in one axial direction and a bearing support portion 260b projecting in the other axial line. The bearing support portion 260b is pivotally supported by the bearing support hole 262b provided at the cover body 262 of the housing. A ring spring 265 is inserted into the cylindrical portion 260a. (Refer to FIG. 17). An axial portion 266e of the magnetic pole carrier 266 with short columnar shape is inserted into the ring spring 265 at the base end portion. A flange portion 266d is formed at the tip end of the magnetic pole carrier 266. In the flange portion 266d, a pair of N and S poles is oppositely provided in a rotating direction and a rotation projection 266a as a contact portion is provided so as to agree to the direction of magnetic force of N ad S indicated by the magnetic poles with a particular angle. (Refer to FIG. 18). A concave and convex surface is provided on the ring spring projecting therefrom and having elasticity in a radial direction. This concave and convex surface is pressed between the inner surface of the cylindrical portion 260a and the outer wall of the axial portion 266e of the magnetic pole carrier 266 and supported thereby to have the ring spring 265 function as a torque limiter. The torque limiter mechanism is formed by the cylindrical portion 260a, axial portion 266e and the ring spring 265. The rotation projection 266a contacts the contact projection 252a provided at the housing main body 252 forming the restriction portion and by contacting the projection 252a the rotation is restricted. The angle α formed by both ends of the contact projection 252a is defined as the rotation permissible angle (Refer to FIG. 18). When the upper rail 212 is moved to the starting end A, as shown in FIG. 19, the rotation projection 266 rotates in one direction and the rotation angle position of the magnetic pole carrier 266 which contacts with the contact projection 252 is defined as the rotation initiating angle position "a". If the rotation projection 266a is not in contact with the contact projection 252a by reaching the starting end A, the relative rotation position of the magnetic pole carrier 266 is adjustably displaced in advance so that the rotation projection 266a contacts with the contact projection 252a. Further, as shown in FIG. 20, when the upper rail 212 is moved to the finishing end B, the rotation projection 266 rotates in the other direction and stops at a position before the position of contacting with the contact projection 252a and this stopping position is defined as the rotation finishing angle position "b". The rotation projection 266a and the contact projection 252a form the rotation restriction mechanism. The magnetic field angle detecting element 267 is oppositely disposed in an axial line direction of the magnetic pole carrier 266 through a magnetic space and the magnetic field angle detecting element 267 is formed by being fixed to the print substrate 269 to form a magnetic sensor 251. The rotation projection 266a and the contact projection 252a make a contact and after an idling, the rotation stops at the rotation initiating angle position "a". The rotation angle of 360 degrees or less of the magnetic force line of the magnetic pole from the rotation initiating angle position "a" is detected as the absolute angle and the displaced position from the starting end A from where the upper rail 212 slides relative to the lower rail 211.

The gear device 44 transmitting the connecting rod 270 to the not shown screw shaft is structure as same as that of the first embodiment, and therefore, the same numerals are given and the explanation thereof is omitted.

The detection of moving position of the upper rail 212 (seat) relative to the lower rail using the seat position detecting device 214 as structured above will be explained hereinafter.

First, after the seat position detecting device 214 is assembled into the power seat slide device 201, the upper rail 212 is slidably moved relative to the lower rail 211 up to the starting end A (mechanical end) by driving the driving device (electric motor) 213. Upon this operation, the rotation projection 266 is rotated in one direction (counter clockwise direction in FIGS. 18 and 19). The rotation projection positioned as shown in FIG. 18, for example, rotates in a counter clockwise direction to be in contact with the contact projection 252a. After the contact since the second output member 260 continues to rotate until it reaches to the starting end A, the second output member 260 idles relative to the magnetic pole carrier 266 by receiving a rotation torque higher than the fastening force of the ring spring 265. When the upper rail 212 reaches to the starting end A, the idling operation stops and the magnetic pole carrier 266 is fixed relative to the second output member 260 by the fastening force of the ring spring 265. Then the rotation projection 266a contacts the contact projection 252a at the rotation initiating angle position "a" corresponding to the starting end A at which the position is determined and the output setting finishes. Thereafter, even the power seat slide device 201 is rotated in the other direction (clockwise direction as viewed in FIG. 20), by the magnetic pole carrier 266, the rotation of the magnetic pole carrier 266 is reduced to one relative rotation or less relative to the housing main body 252 and therefore, the magnetic pole carrier 266 is used under the condition that rotation projection 262a is again disengaged from the contact projection 252a (Refer to FIG. 20), the output setting condition (the relative rotation angle position of the magnetic pole carrier 266 relative to the second rotation output member 260) will not be changed by the fastening force of the ring spring 265.

And, when the power seat slide device 201 is used, first, in FIG. 11, the driving device (electric motor) 213 is driven and the rotation of the driving device 213 is decelerated by the driving deceleration gear device (not shown). Then, the rotation is transmitted to the connecting rod 270 which penetrates the worm wheel (not shown) which is located at the output side of the driving deceleration gear device. When the connecting rod 270 is rotated, input gears (not shown) of the pair of right and left gear devices 44 are rotated. Then, the screw shaft (not shown) which is connected to the output gear of the gear devices 44 rotates, the relative rotation generated between the feeder screw portion (not shown) of the screw shaft and the nut member is converted into the relative position change in an axial direction. This nut member is fixed to the lower rail 211 and thus the screw shaft is relatively moved in a front/rear direction relative to the nut member. Thus, the sliding operation is carried out in which the upper rail 212 is displaced with a certain amount relative to the lower rail 211.

Further, in the seat position detecting device 214, by rotation of the connecting rod 270, the eccentric shaft 253 is eccentrically rotated and by this eccentric rotation of the eccentric shaft 253, the first outer gear wheel 257 is rotated internally in contact with the first inner gear wheel 256 provided in the housing main body 252. At this time, the first outer gear wheel 257 rotates more than the first inner gear wheel 256 by the number of tooth difference. In this case, the number of tooth of the first outer gear wheel 256 relative to the number of tooth difference is defined as the speed ratio (gear ratio). In this embodiment, first in the first hypo-cycloid mechanism, since the first inner gear wheel 256 is fixed to the housing main body 252, the first outer gear wheel 257 rotates by the tooth number difference with the first inner gear wheel 256 with respect to one rotation of the eccentric shaft 253. The number of tooth of the first outer gear wheel 257 relative to the number of tooth difference is defined as the speed ratio (gear ratio).

Similarly, in the second hypo-cycloid mechanism, since the second inner gear wheel 259 is rotated more than the second outer gear wheel 258 by the number of tooth difference and the number of tooth of the second inner gear wheel 259 relative to the number of tooth difference is defined as the speed ratio. The first rotation output member 255 formed with the second inner gear wheel 259 is formed with a second output outer gear wheel 263. The second rotation output member 260 formed with the second output outer gear wheel 264 with which the first output outer gear wheel 263 engages is rotated in association with the first rotation output member 255. According to the embodiment, the number of tooth of the second rotation outer gear wheel 264 is larger than that of the first output outer gear wheel 263 and therefore further deceleration is achieved. The magnetic pole carrier 266 is rotated in synchronizing with the rotation of the second rotation output member 260 to rotate the magnetic field angle in a radial direction of the magnetic pole. This rotation angle is detected by the magnetic field angle detecting element 267 provided opposite to the magnetic pole carrier 266. Thus even the detection range for the magnetic field angle detecting element 267 is limited to within 360° C. the deceleration speed ratio is set so as not to have the detecting range to be equal to or less than 360° C. even at the full stroke of the power seat slide device 201 in front/rear direction. Further, in FIG. 21, the magnetic field angle change in response to the moving position of the upper rail 212 can be programmed to be linearly by electronic trimming process. This electronic trimming process has to be carried out during the manufacturing stage electrically connecting by an electric wire from outside to the magnetic field angle detecting element 267 and the electric connection is made through a connector 268. The absolute position of the seat (upper rail 212) of the power seat slide device 201 can be always detected by setting particular linear characteristics between the rear end (finishing end B) and the front end (starting end A) of the sliding from the output performance.

According to the seat position detecting device 214 above, the connecting rod 270 is rotated by the driving of the driving device 213 and while the upper rail 212 is moved to the starting end A, the magnetic pole carrier 266 is rotated in one direction so that the rotation projection 266a of the magnetic pole carrier 266 contacts the contact projection 252a to restrict the further rotation. Thereafter, until the upper rail 212 reaches the starting end A, the second rotation output member 260 idles relative to the magnetic pole carrier 266 by the function of the torque limiter mechanism 265, 260a and 266e. When the upper rail 212 reaches the starting end A, the magnetic pole carrier 266 is defined the position to the rotation initiating angle position "a" of the magnetic pole carrier 266 corresponding to the starting end A. Thus the rotation initiating angle position "a" is defined as the reference rotation angle so that the moving position of the upper rail 212 from the starting end A can be detected by the magnetic sensor 251. After the magnetic pole carrier 266 is set to the rotation initiating angle position "a", when the upper rail 212 is moved to the finishing end B, the rotation angle of the second rotation output member 260, the rotation of which is decelerated to one rotation or less, is smaller than the rotation permissible angle α and since the rotation projection 266a of the magnetic pole carrier 266 rotating in synchronizing with the second rotation output member 260 does not contact the contact projection 252a, the relative rotation angle of the magnetic pole carrier 266 relative to the second rotation output member 260 has not been changed and the rotation initiating angle position "a" of the magnetic pole carrier 266 corresponding to the starting end A has not been changed. When the moving position is detected referencing the finishing end B, by moving the upper rail 212 to the finishing end B, the position of the magnetic pole carrier 266 can be defined to the rotation finishing angle position "b" corresponding to the finishing end B. Thus, the moving position of the upper rail 212 from the finishing end B can be detected by the magnetic sensor 251. Thus, by just moving the upper rail 212 to the starting end A or finishing end B, the position of the magnetic pole carrier 266 can be defined to the rotation initiating angle position "a" or the rotation finishing angle position "b". Accordingly, the seat position detecting device 214 can be simply and with a short time assembled to the moving device (connecting rod 270, gear device 44, screw shaft, nut member etc.) of the upper rail 212 without post process in which the electronic adjustment has to be carried out under a seat slide being operating.

Further, since the output rotation is transmitted to the magnetic pole carrier 266 from the second rotation output member 260 which is provided in parallel with the connecting rod 270 as an input shaft, the magnetic sensor 251 opposite to the magnetic pole carrier 266 can be disposed at off centered position from the axial center of the connecting rod 270 and the axial attaching space problem for the connecting rod 270 can be solved.

Further, since the deceleration device 250 has a two stage hypo-cycloid mechanism, a large deceleration ratio can be obtained and the absolute position of the upper rail can be easily detected by decelerating the rotation speed of the connecting rod 270 in response to the stroke of the upper rail 212 to one rotation or less of the second rotation output member 260. Further, since the two stage hypo-cycloid mechanism can be made in compact and the seat position detecting device 214 to be attached to the vehicle can be made small in size and light in light.

It is noted here that in the embodiment above, the seat position detecting device is connected to the screw shaft, electric motor or the connecting rod, however the invention is not limited to this structure and the seat position detecting device may be connected to the rotation shaft which moves the seat (vehicle mobile object) by motor (driving source) to detect the rotation thereof. Thus, the absolute position of the seat can be detected by a large deceleration ratio from, for example, even a high rotation speed rotation shaft. Accordingly, the seat position detecting device (position detecting device) can be structured to be randomly placed in any optimum position in consideration of design, mechanism, space and maintenance.

Further, the potentiometer is used as the rotation sensor, but not limited to this and any known detecting device such as for example, rotary encoder may be selectively used as the rotation sensor.

Also, the two stage hypo-cycloid mechanism used in the embodiment is the type in which the number of tooth of the first inner gear wheel is more than the number of tooth of the first outer gear wheel by a small number of teeth and the number of tooth of the second inner gear wheel is more than the number of tooth of the second outer gear wheel by a small number of teeth. However, the invention is not limited to this type and the type in which the number of tooth of the first inner gear wheel is smaller than the number of tooth of the first outer gear wheel by a small number of teeth and the number of tooth of the second inner gear wheel is smaller than the number of tooth of the second outer gear wheel by a small number of teeth may be used.

Further, the deceleration device is not limited to the two stage hypo-cycloid mechanism, but any type may be used as far as the output rotation shaft, the rotation of which is detected by a magnetic sensor or the like, is decelerated to one rotation or less. For example, the one stage hypo-cycloid mechanism may be used.

According to the embodiment above, the seat position device 14 for detecting a position of the seat slide device is embodied as a vehicle position detecting device. However, the seat position device 14 is not necessarily used only for detecting the position of the seat slide device. For example, it may be used as a position (angle) detecting device for detecting a reclining angle of the power reclining device which changes automatically the seat reclining angle by driving force of motor. Further, the application subject is not only the seat but also a vehicle component driven by a motor to be automatically operated, such as, a back door of the vehicle, a slide door, or a sun-roof, in which an open or closed position is detected.

Further, according to the third embodiment, the second rotation output member and the magnetic pole carrier are made as separate members. However, the invention is not limited to this structure and the second rotation output member and the magnetic pole carrier may be made integrally with magnetic characteristics as a whole and a cancelling mechanism may be disposed between the first rotation output member and the second rotation output member. In this case, the first rotation output member is the output shaft and the second rotation output member is the magnetic pole carrier.

The first rotation output member and the second rotation output member are placed in parallel according to the embodiment, however, the invention is not limited to this structure and for example, the second rotation output member is omitted and the magnetic pole carrier is assembled to the first rotation output member via a torque limiter mechanism. The rotation is detected by a magnetic sensor from a position in series with the output rotation shaft of the deceleration device.

The rotation initiating angle position "a" of the output rotation shaft (magnetic pole carrier 266) corresponds to the starting end A of the upper rail 212. However, the invention is not limited to this structure and the rotation finishing angle position "b" of the output rotation shaft (magnetic pole carrier 266) may be set to correspond to the finishing end B by providing an idling mechanism for adjustment. The starting end A and the finishing end B are not necessarily provided at the mechanical ends to enable the upper rail to slide relative to the lower rail and they may be the starting end and finishing end within a slide controlling range.

USAGE POSSIBILITY IN INDUSTRY

The position detecting device for a vehicle and the seat position detecting device according to the invention are suitable for controlling the seat (movable portion) displacement by detecting easily and accurately the moving position of a vehicle movable portion, particularly of a seat device with a power slide function.

The invention claimed is:

1. A vehicular position detecting device for detecting a position of a mobile object for the vehicle which is moved by a driving force of a rotary driving source including:
   a deceleration device having a two-stage hypo-cycloid mechanism decelerating the rotation amount of a rotation shaft rotated plural revolutions to one revolution or less by the driving source when the mobile object is moved; and,
   a rotation sensor detecting a rotation output from the deceleration device as an absolute angle, wherein a position of the mobile object is detected based on the absolute angle detected by the rotation sensor.

2. The position detecting device for a vehicle according to claim 1, wherein the deceleration device includes:
- an eccentric shaft connected to the rotation shaft and having a central axis de-centered from the rotation center of the rotation shaft;
- an eccentric rotation body supported on the eccentric shaft for relative rotation therewith;
- a housing rotatably supporting the eccentric shaft and accommodating the eccentric rotation body therein;
- a first stage hypo-cycloid mechanism having a first inner gear wheel provided coaxially with the rotation shaft in the inner peripheral portion of the housing and a first outer gear wheel formed on the eccentric rotation body with the tooth number less than that of the first inner gear wheel by a small number and engaged with the first inner gear wheel; and
- a second stage hypo-cycloid mechanism having an output shaft rotatably supported on the housing and coaxial with the rotation shaft, a second inner gear wheel formed on and coaxial with the output shaft and arranged in parallel with the first inner gear wheel and a second outer gear wheel formed on the eccentric rotation body with the number of tooth less than that of the second inner gear wheel by a small number and engaged with the second inner gear wheel.

3. The position detecting device for a vehicle according to claim 1, wherein the rotation shaft is a component of a driving force transmitting mechanism provided between the output shaft of the driving source and the mobile object for transmitting the driving force of the driving source to the mobile object.

4. The position detecting device for a vehicle according to claim 1, wherein the rotation shaft is an output shaft of the driving source.

5. A seat position detecting device comprising a position detecting device of claim 1, the position detecting device being provided to a seat slide including a lower rail adapted to be secured to a vehicle floor, an upper rail slidably supported by the lower rail and supporting a vehicle seat, a screw shaft rotatably supported by either one of the lower rail and the upper rail, a nut member engaged with the screw shaft and fixed to the other one of the lower rail and the upper rail and a motor as a driving source connected to the screw shaft through a transmitting mechanism and rotating the screw shaft whereby a vehicle seat slide device for relatively moving the lower rail and the upper rail with a certain amount, wherein the deceleration mechanism is disposed in either the screw shaft, the rotation shaft of the transmitting mechanism, or the output shaft of the motor, whereby a displaced position of the upper rail relative to the lower rail is detected.

6. A position detecting device for a vehicle for detecting a position of a mobile object for a vehicle which is movable between a starting end and a finishing end, comprising:
- a deceleration device for decelerating the rotation of the input shaft rotatably driven by a driving source to a rotation equal to or less than one revolution of the output rotation shaft upon moving the mobile object;
- a magnetic pole carrier, to which the output rotation from the output rotation shaft of the deceleration device is transmitted, magnetized so that the positive and the negative poles are alternately arranged in a rotation direction;
- a rotation restriction mechanism including a contact portion provided on the magnetic pole carrier and a restriction portion provided on the housing on which the output rotation shaft is supported, wherein a rotation permissible angle from the condition that the contact portion is in contact with the restriction portion to the condition that the contact portion is rotated in the other direction to be in contact with the restriction portion is set to be larger than the rotation angle of the output rotation shaft thereby to restrict the rotation of the magnetic pole carrier by the contact between the contact portion and the restriction portion;
- a torque limiter mechanism for setting a rotation initiating angle position of the magnetic pole carrier which corresponds to the starting end by rotating the output rotation shaft in one direction keeping the restriction portion to be in contact with the contact portion or for setting a rotation finishing angle position of the magnetic pole carrier which corresponds to the finishing end by rotating the output rotation shaft in the other direction keeping the restriction portion to be in contact with the contact portion; and,
- a magnetic sensor for detecting rotation angle of the magnetic poles of the magnetic pole carrier, whereby the position of the mobile object from the starting end or from the finishing end based on the rotation angle is detected by the magnetic sensor.

7. The position detecting device according to claim 6, wherein the output rotation shaft is supported by the housing in parallel with the input shaft.

8. The position detecting device according to claim 6, wherein the deceleration device includes a two stage hypo-cycloid mechanism.

* * * * *